US005942174A

United States Patent [19]

Thole et al.

[11] Patent Number: 5,942,174

[45] Date of Patent: Aug. 24, 1999

[54] METHOD OF MAKING ORGANICALLY BOUND WOOD-BASED MATERIALS

[75] Inventors: Volker Thole; Jadranko Jahic, both of Braunschweig, Germany

[73] Assignee: Fraunhofer-Gesellschaft zur Foerderung der angewandten Forschung e. V., Munich, Germany

[21] Appl. No.: 08/941,998

[22] Filed: Oct. 1, 1997

[30] Foreign Application Priority Data

Oct. 1, 1996 [DE] Germany ........................... 196 40 593

[51] Int. Cl.[6] ........................................ B29C 43/26

[52] U.S. Cl. ............................ 264/83; 264/109; 264/120

[58] Field of Search .............................. 264/83, 120, 109

[56] References Cited

U.S. PATENT DOCUMENTS

| | | | |
|---|---|---|---|
| 3,280,237 | 10/1966 | Corbin et al. | 264/83 |
| 4,393,019 | 7/1983 | Geimer | 264/83 |
| 4,517,147 | 5/1985 | Taylor et al. | 264/83 |
| 4,684,489 | 8/1987 | Walter | 264/120 |
| 5,778,892 | 8/1998 | Graf | 264/120 |

*Primary Examiner*—Mary Lynn Theisen
*Attorney, Agent, or Firm*—Karl Hormann

[57] ABSTRACT

A method of fabricating a particle board from ligno-cellulose containing particles and an organic binder material, including initially forming a web of binder material coated particles, spraying of predetermined quantities of water on the surfaces of the web, compressing the web to a first thickness between heated press platens, increasing the spacing between the press platens to a dimension greater than the first thickness and rapidly raising the temperature in the center of the web by more than 15° C.

24 Claims, 4 Drawing Sheets

METHOD OF MAKING ORGANICALLY BOUND WOOD-BASED MATERIALS

BACKGROUND OF THE INVENTION

1. Field of the Invention

The invention, in general, relates to a method of fabricating organically bound wood-based materials and, more particularly, to a method of fabricating boards from particles such as chips and fibers containing lignocellulose and organic binding materials. Such boards are called, and will hereinafter sometimes be referred to as, particle boards.

2. Background of the Invention

Wood-based materials made from fibers, chips or strands may be fabricated particularly economically using organic binding materials. Condensation resins, such as, for instance, urea- and phenol-formaldehyde and isocyanates, including mixtures thereof, are most often used for agglutination. The hardening or curing time of organic binders is a function of temperature as well as of time. For reasons of economy or efficiency the fibrous webs made from agglutinated particles are usually compressed in heat presses. Aside from other factors such as the type of binder used, the shape of the particles, and the structure of the fibrous web, the compression or molding time is decisively determined by the time required for heating the fibrous web to the gel point or gelation temperature of the binder. Since the cost-efficiency of the fabrication of wood-based materials is significantly influenced by the required compression time $t_p$, it is desirable that heat penetrate into the fibrous web in the shortest possible time. Heat is transferred from the heat press plates to the fibrous web by heat conduction and convection. High densities result in high fluid resistances and low moisture detrimentally affects heat conduction. Yet mechanical specifications of the wood-based materials call for board densities at which the high fluid resistance significantly affects the compression time. However, it is not expedient to compensate for this negative influence of the density by a higher moisture content of the particles in the entire chip mass. While it is possible to reduce the time required for heat penetration, the overall press time is not reduced because it is necessary for steam to escape by way of the narrow surfaces of the board.

Several methods have been proposed and used in practical applications. Thus, DE F1658 XII/381 proposes to vary the moisture in the individual layers of a board or web. Heat penetration is enhanced if the cover layers are significantly moister than the center layer. The moisture of the particles has, however, to be selected such that the quantity of steam convected into the center layer leads to more rapid heating without, at the same time, creating an internal pressure which would destroy the glue joints between particles of the center layer when the press is opened, by rupturing those joints. The steam energy useful for heat penetration is, therefore, limited.

Selective through-heating by steam flowing form the moist cover layers into the center layer constitutes the physical basis of the steam injection process developed by Klauditz. In this process, the cover layers of a fibrous chip web are sprayed with water. In respect of through-heating spraying water onto the cover layers (moistening) has been found to be superior to using chips of increased moisture contents. The evaporation of water permeating the wood structure as moisture requires more energy than the water deposited on chip surfaces (Kollmann, HRW 1957, pp. 35–44; Keylwerth, Holzforschung und Holzverwertung 1959, pp. 51–57; Stegmann, v. Bismark, Holzforschung und Holzverwertung 1967, pp. 53–59).

The time required to reach the boiling point in the center of the fibrous web depends upon the temperature of the heating plates and upon the quantity of water $m_w$ sprayed onto a given surface area. Several experiments have shown that beyond a certain quantity of water the relationship between the applied quantity of water and the time required for through-heating regresses. For practical purposes, quantities of water in excess of 200 g/m$^2$ with chip boards of 20 mm thickness are not expedient. Moreover, large sprayed-on quantities of water result in reduced flexural and peeling strengths. High heating plate temperatures improve rapid evaporation of the sprayed-on water, and the time required for through-heating is lessened.

A further process of reducing the press time has been described by Pungs and Lamberts (HRW 1954, pp. 20–25). In accordance with this process, a particle board web is heated by high frequency heating rather than by heating plates. The advantage of such a process is uniform heating throughout the entire thickness of the board. Its disadvantage is its high consumption of electrical energy. Nor has pre-heating of fibrous webs by high frequency found any acceptance notwithstanding the fact that in a chip board of 20 mm thickness, pre-heating from 20° C. to 60° C. resulted in a press time reduction from 160 seconds to 90 seconds. Aside from its high energy consumption, a further and serious disadvantage of this process are the difficulties of shielding the fiber board support from adjacent support components and to structure it without using metal.

The through-heating of fibrous webs by means of steam is described in U.S. Pat. No. 4,517,147. In accordance with the system there disclosed, the press plates are perforated, and during closure of the press, steam may be blown into the web over the surface of the board. The released condensation heat leads to a rapid through-heating of the web. The complexity of the apparatus is at present justified only in connection with thick boards and with insulating webs which because of their low density have poor heat conducting properties.

The heretofore known methods of rapidly through-heating chip or fiber board webs require particularly complex equipment where press times are desired which are shorter than those of Klauditz's steam injection method.

OBJECTS OF THE INVENTION

It is accordingly a primary object of the invention to provide a novel method in which press times are realized which a significantly shorter than those attainable by the steam injection process.

Another object of the invention is to provide for a method of the kind referred to which may be practiced with relatively simple equipment.

BRIEF SUMMARY OF THE INVENTION

In accordance with a currently preferred embodiment of the invention, there is provided a method of making wood-based materials from ligno-cellulose containing particles and organic binders by maintaining a fibrous web in a hot press in a state of supercompression corresponding to about 0.8 . . . 0.98 $d_{soll}$ (press phase $t_0$) i.e. 80% to 98% of the desired thickness, for about 20 to about 90 seconds but at least for the time necessary for bringing about in the cover layers moistened by spraying 50 . . . 100 g of water on each surface of the web a change in the aggregate state of the water from its liquid phase to its steam phase and for the energy content of the steam to be sufficient during the subsequent increase in the spacing between the press platens to the desired thickness of the board ($d_{soll}$) (pressure phase $t_H$) to induce a spontaneous temperature increase T of at least 15° C. in the center of the web.

The steam pressure difference and the temperature difference between cover layers and center layer and a relatively low flow resistance in the center layer of the board are decisive for rapid through-heating. Following compression of the web in the heat press to less than the desired board thickness (press phase $t_0$) the water contained in the cover layer, assisted by the excellent heat conductivity as a result of the high density, is rapidly converted into its steam phase. Increasing the spacing of the press platens to correspond to the thickness of the board (press phase $t_H$) leads to a marked reduction in the flow resistance, and the steam stored in the cover layers flows into the center layer. Practicing the method in accordance with the invention led to the surprising finding that supercompression of the web in the heat press has either no effect on the mechanical properties of the board, or only a very insignificant one. Very rapid through-heating of the web is initiated by a hitherto unknown "secondary steam injection effect". Provided such influential parameters as pressure, temperature, moisture contents of the chips, supercompression time, particle size and closure and opening rates of the press are properly coordinated, through-heating rates in excess of 10° C./sec may be attained. No additional equipment such as heaters and steam generators are necessary. Moist cover layer particles, instead of sprayed-on water, are particularly advantageous for the production of MDF (medium density fiber boards) as they prevent the formation of stains.

For fabricating thick boards, the increase in the platen spacing to the desired thickness is followed by a further supercompression phase. It has been found that an additional supercompression again leads to a high temperature and pressure difference between the outer board region and its center layer. This difference may be utilized for rapid through-heating to the center layer even if during the first phase the quantity of steam was insufficient for through-heating to the boiling point. Until the temperature of the center layer has reached 100° C., the press may also be opened and closed in an oscillating manner.

Where webs are compressed to boards having high resilient or rebounding properties, the press, following the supercompression, may be briefly opened to an extent wider than the desired board thickness (press platen spacing > desired thickness of the board). The flow resistance would then be even less, and the through-heating of thick platens in particular is improved.

Any of the common condensation glues and isocyanate may be used as binder materials. A particular advantage of the method in accordance with the invention is that even those binder materials may be used which prior to their hardening or curing require swelling. Such binder materials may, for instance, be of the kind containing starches or proteins.

Advantageously, by spraying a predetermined quantity of water on the surfaces of the web relative to the thickness thereof the moisture of the web surfaces is significantly higher than the moisture of particles at intermediate web layers. By way of example, the quantity of water $m_w$ relative to each mm of board thickness d may be 4.5 g/m$^2$ d $m_w$ 10 d g/m$^2$.

Preferably, subsequent to glue coating at least a portion of the particles at the web surfaces will have a moisture content relative to each mm of board thickness d of between 1.25% d and 7% d.

In another preferred embodiment of the invention, the distance between the press platens will be increased to the desired board thickness once a temperature between 25° C. and 90° C. has been reached at the center of the board.

In a further advantageous embodiment of the method, the distance between the press platens is increased to the desired board thickness when in a range dependent upon the desired thickness of the board the boiling point of water has been reached in a zone of 1 mm below the surface of the web and 1.5 mm above the center of the web.

In another embodiment of the method in accordance with the invention, immediately following the increase of the spacing between the press platens to the desired board thickness the web is subjected to another supercompression followed by an increase of the spacing between the press platens to correspond to the desired board thickness.

Advantageously, supercompression and increasing of the press platen spacing to correspond to the desired board thickness are periodically repeated.

In yet another embodiment of the method in accordance with the invention, the spacing between the press platens is initially increased to a dimension in excess of the desired board thickness and is reduced to the desired board thickness following a dwell time of not more than 5 sec.

Still another embodiment of the method in accordance with the invention provides for maintaining a specific press force $p_s$ of between about 0.1 N/mm and about 1.0 N/mm following the increase of the spacing between the press platens to the desired board thickness.

Other objects and advantages of the invention will in part be obvious and will in part appear hereinafter.

BRIEF DESCRIPTION OF THE SEVERAL DRAWINGS

The novel features which are considered to be characteristic of the invention are set forth with particularity in the appended claims. The invention itself, however, in respect of any structure, construction, lay-out and design, as well as manufacturing techniques, together with other objects and advantages thereof, will be best understood from the ensuing description of preferred embodiments when read with reference to the drawings, in which:

DETAILED DESCRIPTION OF THE PREFERRED EMBODIMENTS

Figure 1:
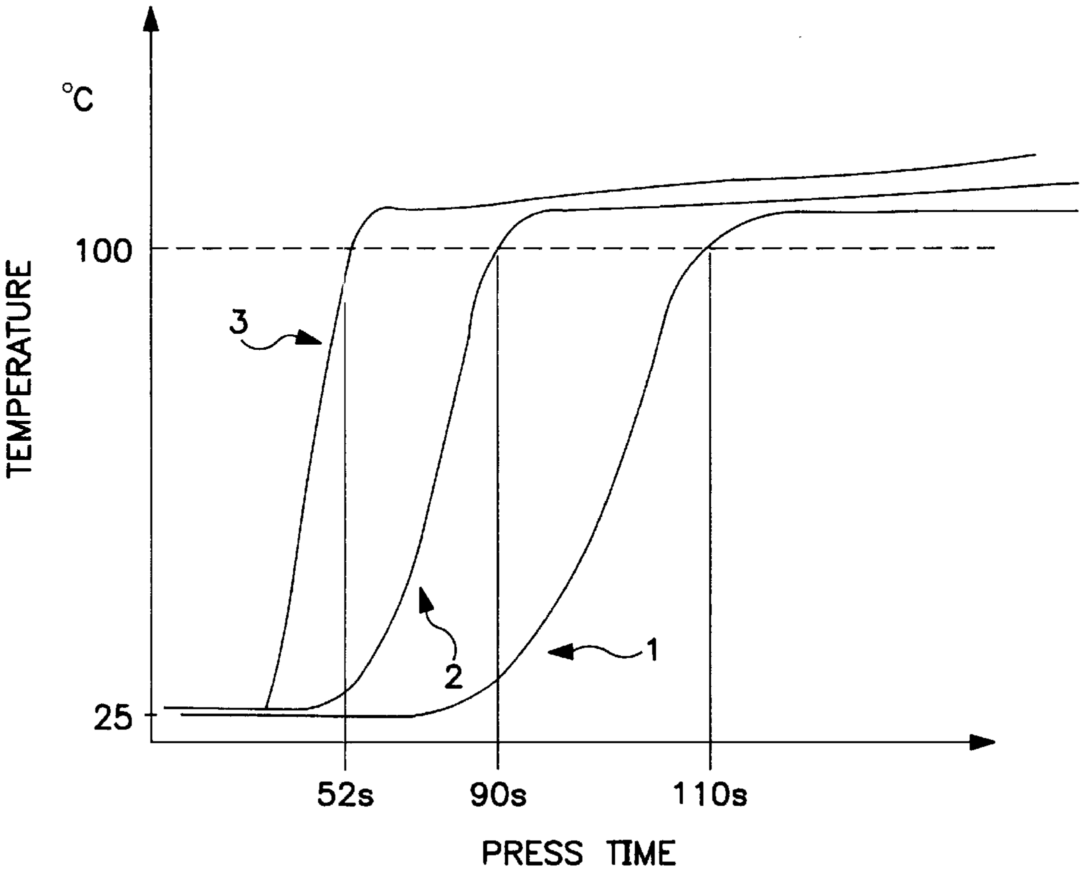
FIG. 1 is a diagram depicting the heating of a center layer during fabrication of chip boards in accordance with Examples 1, 2 and 5, as a function of time and of pressure conditions with an without surface moistening.
Figure 2:
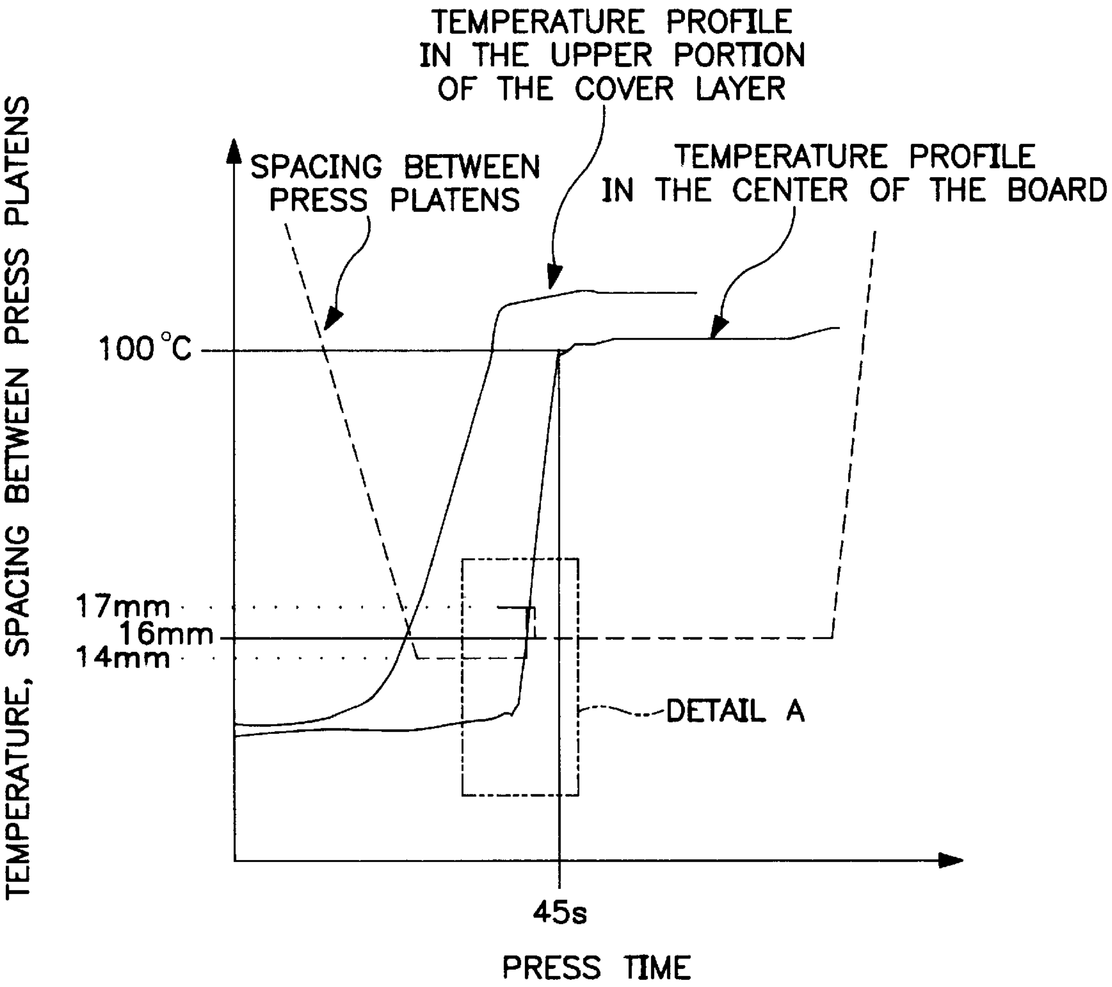
FIG. 2 is a diagram depicting the press platen spacing and temperature profile in a cover layer and center layer, respectively, during fabrication of a chip board including a secondary steam injection in accordance with Example 9.
Figure 3:
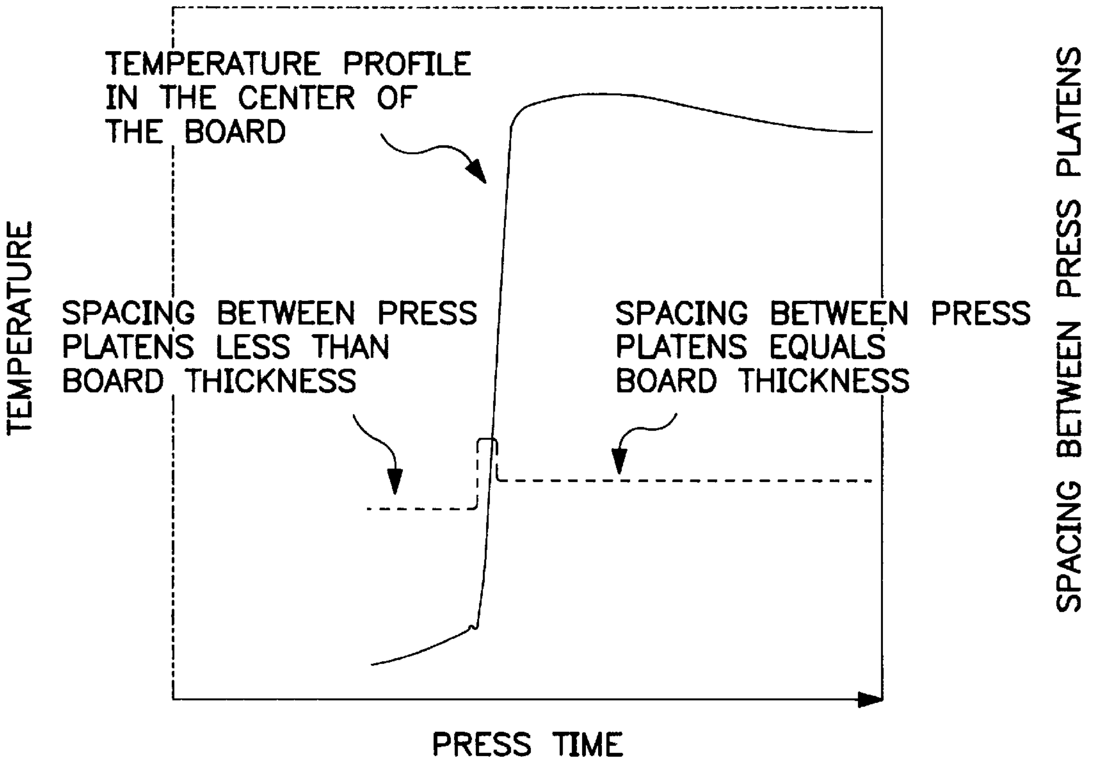
FIG. 3 is a detail of FIG. 2.
Figure 4:
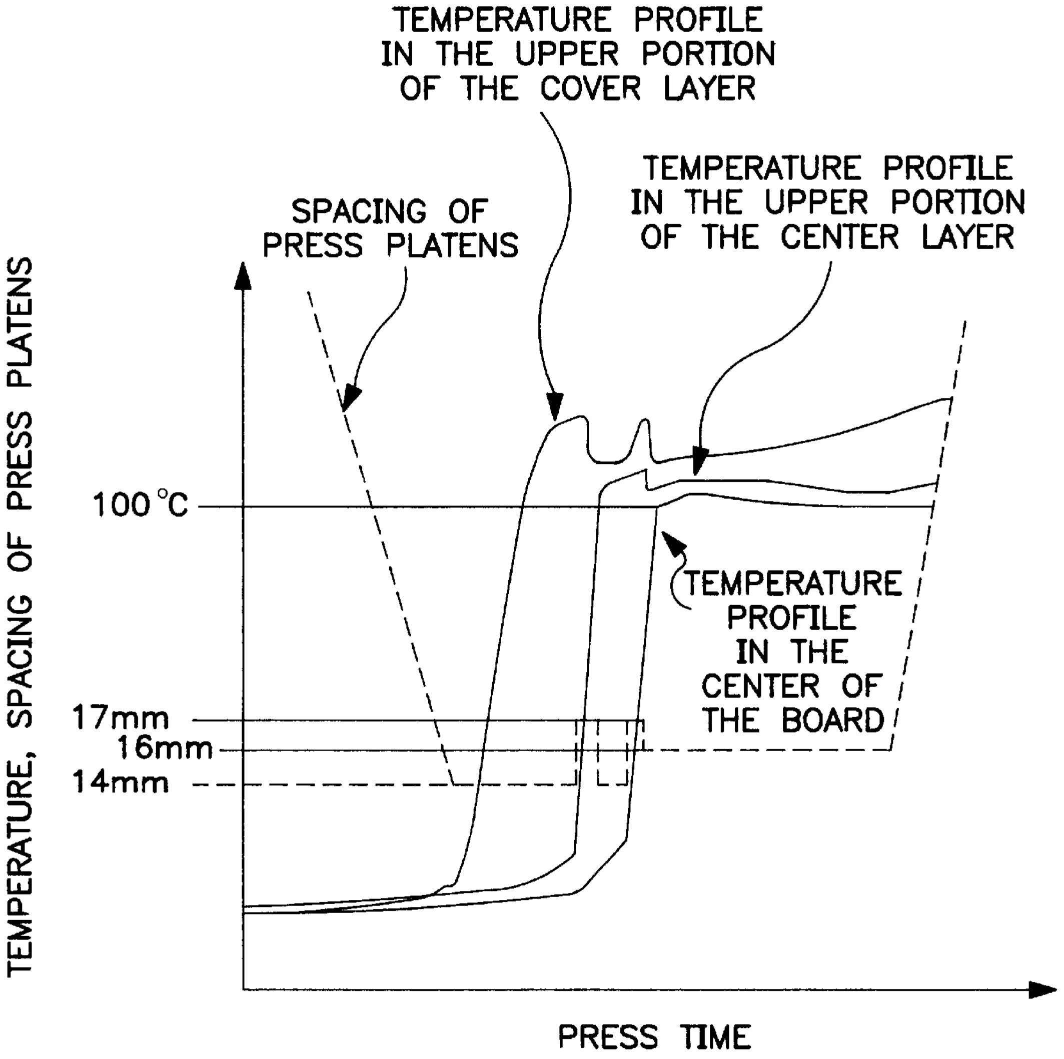
FIG. 4 is a diagram depicting the press platen spacing and temperature profile in cover, intermediate and center layers during heat pressing of wood-based materials in accordance with the method of the invention, including a double secondary steam injection as described in Example 9.

As has been mentioned supra, the particle or fiber boards are fabricated in heat presses. These heat presses are conventional and for the sake of clarity of the instant disclosure will not be described, nor will they be depicted in the drawings as those skilled in the art are deemed to be familiar with their structure and operation.

EXAMPLE 1

For fabricating a single layer particle board having, in its raw state, a density of 650 $kg/M^3$ and a thickness of 16 mm, chips dried to a moisture content of 3% were coated with a common urea-formaldehyde resin glue (glue 10% relative to chips). At a solid resin content of 60% in the liquid glue, the moisture of the chips, subsequent to applying the glue, was 9.6%. The glue coated chips were spread out as a web and compressed in a heat press with a heating platen temperature of 220° C. A conventional press program was chosen for the heat pressing, i.e. subsequent to reducing the press platen spacing to the thickness of the web, the web was further compressed to the desired board thickness at a compression rate of 7 mm/sec. After 110 sec, the temperature measured in the center of the web by an inserted thermal element (press phase $t_D$) was 100° C. At a selected specific press time of 11 sec/mm the board had to remain in the press for an additional 66 sec (press phase $t_H$). The temperature profile corresponds to curve 1 in FIG. 1.

EXAMPLE 2

A further board was fabricated with the same glue covered chip material and by the same press program. However, in contrast to Example 1, a quantity of 100 $g/m^2$ of water was sprayed on each surface of the web. Because of the steam injection a temperature of 100° C. was reached (curve 2 in FIG. 1) in the center of the web after only 90 sec (press phase $t_D$). For hardening or curing the glue a further press time of 66 sec was required similar to Example 1 (press phase $t_H$). This resulted in a total press time $t_{ges}$ of 156 sec. At the new specific press time of 9.75 sec/mm the reduction in press time, as compared to the press time of Example 1, was 28 sec.

EXAMPLE 3

A web prepared as in Example 2 was initially compressed in a heat press at a compression rate of 7 mm/sec to a board thickness of 14 mm. At a temperature of 80° C. at the center of the board the spacing between the press platens was increased to the desired board thickness (16 mm). The time required to reach a temperature of 100° in the center of the board was 77 sec. This resulted in an overall press time $t_{ges}$ of 143 sec. At the new specific press time of 8.9 sec/mm the reduction in press time was 33 sec as compared to the press time of Example 1.

EXAMPLE 4

A web prepared as in Example 2 was initially compressed to a thickness of 14 mm in a heat press at a compression rate of 7 mm/sec. At a temperature of 70° C. at the center of the board the spacing between the press platens was increased to the desired board thickness (16 mm). Heating the center of the board to 100° C. required 68 sec. This resulted in a total press time $t_{ges}$ of 134 sec. At the new specific press time of 8.3 sec/mm the reduction in press time, relative to the press time of Example 1, was 42 sec.

EXAMPLE 5

A web prepared as in Example 2 was compressed to a board thickness of 14 mm in a heat press at a compression rate of 7 mm/sec. At a temperature of 70° C. in the center of the board, the spacing of the press platens was increased to the desired board thickness (16 mm). The time required to reach a temperature of 100° C. in the center of the board was 52 sec (curve 3 in FIG. 1). Hence, the total press time $t_{ges}$ was 118 sec. The reduction in press time, at the new specific press time of 7.3 sec/mm, was 58 sec, compared to the press time of Example 1.

EXAMPLE 6

To fabricate an medium density fiber board (MDF) with a density, in its raw state, of 800 $kg/m^3$, chips dried to a moisture content of 3% were coated with a conventional urea-formaldehyde resin glue (glue 10% relative to the fibers). At a solid resin content of 60% in the liquid glue the moisture content of the chips, following coating, was 9.6%. The glue-coated chips were spread out as a web and following a pre-compression, were compressed by a heat press (press platen temperature 220° C.). A conventional press program was selected for the heat compression. That is to say, once the spacing between the platens had been reduced to the web thickness, the web was compressed to the desired board thickness at a compression rate of 7 mm/sec. After 132 sec a temperature of 100° C. was measured in the center of the web (press phase $t_D$) by an inserted temperature element. At the selected specific press time of 13 sec/mm the board had to remain within the press for an additional 76 sec (press phase $t_H$).

EXAMPLE 7

A further board was fabricated with the same glue-coated fibrous material as in Example 6. In contrast to Example 6 and following precompression, 100 $g/m^2$ of water was sprayed onto each web surface. In the heat press, the web was initially compressed to a thickness of 14 mm. At a temperature of 60° C. in the center of the board, the spacing between the press platens was increased to the desired board thickness (16 mm). The heating time to reach 100° C. in the center of the board was 55 sec. This resulted in a total press time $t_{ges}$ of 121 sec. At the new specific press time of 7.6 sec/mm, the press time was reduced by 87 sec, compared to the press time of Example 6.

EXAMPLE 8

A web prepared as in Example 7 was initially compressed in a heat press to a thickness of 14 mm, at a compression rate of 7 mm/sec. At a temperature of 40° C. in the center of the board the spacing between the press platens was increased to the desired board thickness (16 mm). Heating the center of the board to 100° C. took 27 sec. This resulted in a total press time $t_{ges}$ of 143 sec. The reduction in press time at the new specific press time of 6.43 sec/mm is 105 sec, compared to the press time of Example 6.

EXAMPLE 9

A web prepared as in Example 2 was compressed to a thickness of 14 mm in a heat press at a compression rate of 7 mm/sec. At a temperature of 70° C. in the center of the board, the spacing between the press platens was increased to 17 mm and after 3 sec it was reduced the desired board thickness (16 mm). The time required to reach a temperature of 100° C. in the center of the board was 45 sec. This resulted in a total press time $t_{ges}$ of 111 sec. The reduction in press time at the new specific press time of 6.9 sec/mm was 65 sec, compared to Example 1.

What is claimed is:

1. A method of making a wood-based material, comprising the steps of:

providing a predetermined quantity of ligno-cellulose containing particles;

coating said particles with an organic binder material;

spreading out said coated particles as a web having two surfaces facing in opposite directions;

spraying a predetermined quantity of water on each of said surfaces;

compressing said web between heated press platens of a press to a first thickness for a time sufficient to change the aggregate condition of said water applied to said web surfaces from a liquid phase to a steam phase of a predetermined level of energy;

increasing the spacing between said press platens to a dimension greater than said first thickness; and causing said steam to raise the temperature at the center of the web by at least 15° C.

2. The method of claim 1, wherein said step of compressing comprises maintaining said web in a supercompressed state in which the thickness of said web is between about 80% and about 98% of its finished thickness for between about 20 and about 90 sec.

3. The method of claim 1, wherein said step of spraying water on said web surfaces comprises spraying from about 50 to about 100 g of water on each of said web surfaces.

4. The method of claim 1, wherein the temperature at the center of said web is raised to 100° C.

5. The method of claim 1, wherein said water is sprayed in a quantity resulting in a moisture content of particles adjacent said web surfaces higher than the moisture of particles adjacent said center of said web.

6. The method of claim 1, wherein following said coating at least a portion of said particles adjacent said web surfaces has a moisture content of between 1.25% and 7% per mm of board thickness.

7. The method of claim 1, wherein said greater dimension substantially corresponds to the desired board thickness.

8. The method of claim 7, wherein said compressing step comprises supercompression.

9. The method of claim 8, wherein said spacing is increased to said desired board thickness when the temperature at the center of the board is between about 25° C. and about 90° C.

10. The method of claim 8, wherein said spacing is increased to said desired board thickness when a temperature of 100° C. has been reached in a region depending on the desired board thickness of about 1 mm below said web surfaces and about 1.5 mm on either side of the center of said web.

11. The method of claim 8, wherein immediately following the increase of said spacing to said desired board thickness said web is subjected to renewed compression and increases in the spacing between said press platens to correspond to said desired board thickness.

12. The method of claim 8, wherein said supercompression and said increase of said press platen spacing corresponding to said desired board thickness are performed repeatedly.

13. The method of claim 1, wherein said spacing corresponding to said desired board thickness is set after less than 5 sec following said increase to said dimension greater than said first thickness.

14. The method of claim 13, wherein said dimension greater than said first thickness is greater than said desired board thickness.

15. The method of claim 1, further including the step of maintaining a specific press force of between about 0.1 N/mm and about 1.0 N/mm following said increase to said dimension greater than said first thickness.

16. A method of making a particle board, comprising the steps of:

providing a predetermined quantity of wood particles dried to a moisture content of about 3%;

coating said wood particles with a urea-formaldehyde resin glue whereby the ratio of glue is 10% relative to the particles;

spreading said coated particles as a web;

compressing said web between heated press platens to a first predetermined thickness at a predetermined compression rate;

heating the compressed web for a time sufficent to establish in its center a temperature of 100° C.; and maintaining said web in between said platens for a time sufficient to cure said glue.

17. The method of claim 16, wherein said wood particles are coated with a glue containing 60% of solid resin.

18. The method of claim 17, wherein said wood particles after coating have a moisture content of about 9.6%.

19. The method of claim 18, wherein said press platents are heated to about 220° C.

20. The method of claim 19, further including the step of spraying water at a quantity of 100 g/m$^2$ on each surface of said web prior to its compression.

21. The method of claim 19, wherein said first predetermined thickness is less than a predetermined desired board thickness and wherein following the compression the spacing between said platens is increased to a dimension substantially corresponding to said desired board thickness.

22. The method of claim 21, wherein said compressed web is heated and maintained between said platens for a time from about 111 to about 156 sec.

23. The method of claim 16, wherein said web is compressed to said first predetermined thickness at a rate of compression of about 7 mm/sec.

24. The method of claim 23, wherein said web is compressed at a specific press time of between about 6.43 and about 9.75 sec/mm.

* * * * *